United States Patent [19]

Marshall

[11] 3,993,298

[45] Nov. 23, 1976

[54] HOLD DOWN ARM

[76] Inventor: Wilbur Alma Marshall, Rte. 2, Box 96 C, Aurora, Mo. 65605

[22] Filed: June 4, 1975

[21] Appl. No.: 583,705

[52] U.S. Cl. .................................. 269/91; 269/100; 269/254 CS

[51] Int. Cl.[2] ............................................ B23Q 3/02

[58] Field of Search ............. 269/1, 91, 95, 99, 100, 269/134, 254 R, 254 CS, 321 H, 321 W; 144/242 R, 242 A–242 M; 83/452, 447, 450, 445, 464, 459, 460

[56] References Cited

UNITED STATES PATENTS

| | | | |
|---|---|---|---|
| 415,435 | 11/1889 | Baker | 144/242 A |
| 546,192 | 9/1895 | Schnauder | 269/254 R |
| 845,263 | 2/1907 | Reller | 269/91 |
| 922,115 | 5/1909 | Epperson | 269/254 R |
| 1,091,655 | 3/1914 | Hampp | 269/91 |
| 1,977,462 | 10/1934 | Van Berkel | 83/460 |
| 2,342,146 | 2/1944 | Joyce | 269/254 |
| 3,052,461 | 9/1962 | Bateman | 269/275 |
| 3,101,104 | 8/1963 | Sullivan | 144/242 B |
| 3,452,976 | 7/1969 | Ross | 269/91 |

*Primary Examiner*—James L. Jones, Jr.
*Assistant Examiner*—Robert C. Watson

[57] ABSTRACT

A horizontally rotatable and elevatable hold down arm that is adapted to engage and securely hold material that is being worked on, such as wood that is being sawed. The hold down arm is simply operated and positioned from the operator's position at the saw.

3 Claims, 2 Drawing Figures

HOLD DOWN ARM

BACKGROUND OF INVENTION

When working on material with power tools, such as sawing wood with radial type saws, it is often necessary to hold down said material with one hand while operating the cutting tool with the other hand, particularly when dealing with small light pieces which tend to move out of position while being cut.

My invention provides a simple, easily operated hold down arm that is readily adjusted for varying thicknesses of workpieces and which is adapted to accommodate irregularities in material being worked.

My invention further provides a means whereby one member of the hold down arm may be quickly replaced by an entirely different member when an unusual work piece, or the surface of the table supporting the work piece, requires that such a change be made.

SUMMARY OF THE INVENTION

More particularly my invention provides a hold down arm that is adapted to be vertically adjusted and locked, then horizontally rotated over the workpiece to a line parallel and close to the path of the traveling saw, and then applied to the workpiece, all from the operator's position at the saw.

Briefly, my invention permits the repositioning of a human hand, usually held close to a whirling saw or tool to secure the material being cut, to a safe distance from the saw or tool, while still maintaining control of the material.

The invention will be further understood by reference to the following description and the accompanying drawing in which.

Figure 1:
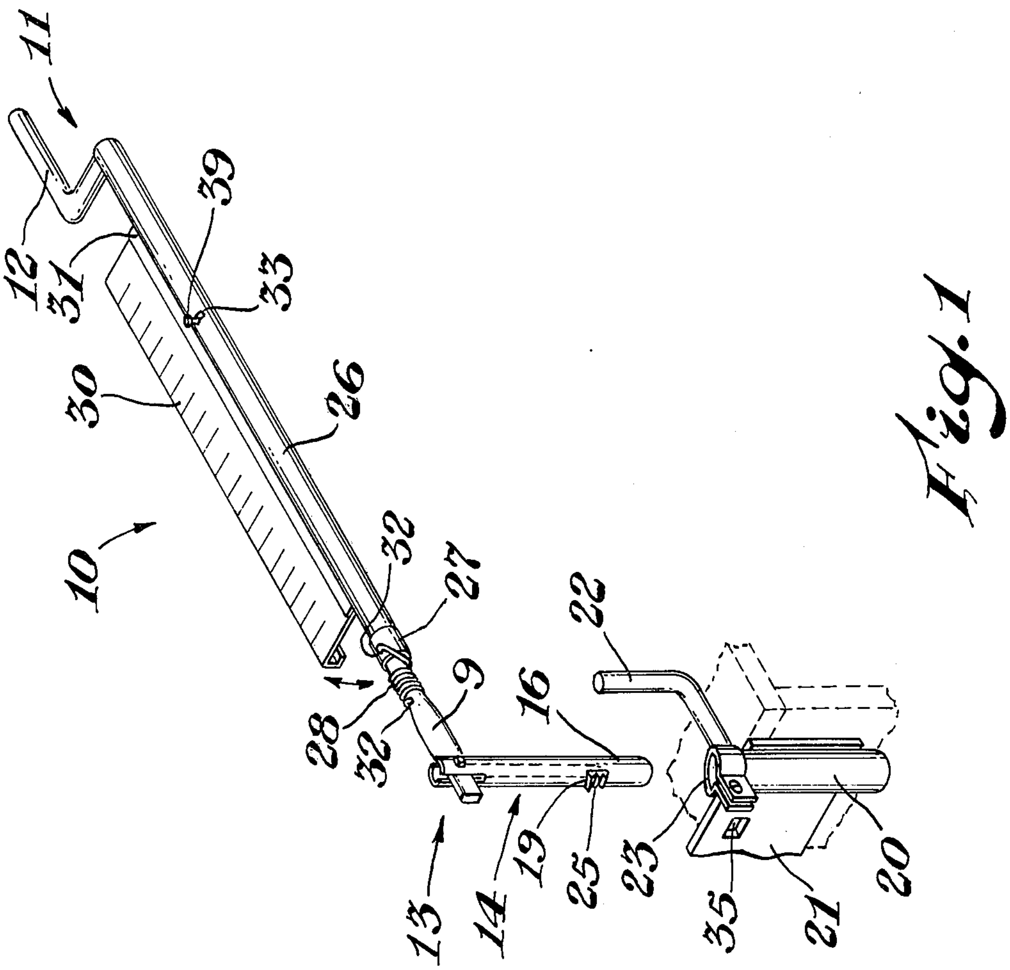
FIG. 1 is an enlarged isometric view of the hold down arm of this invention.
Figure 2:
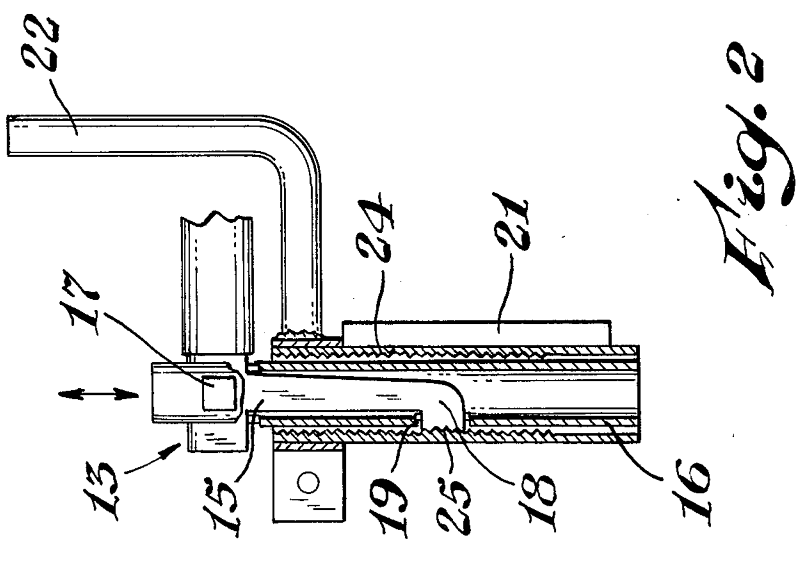
FIG. 2 is a sectional view showing the positioning and locking mechanism.

Referring to FIGS. 1 and 2 the hold down arm 10, comprises a rigid core piece 9, a tube or sheath 26, rotatably surrounding the core piece 9, a first end 11 having a handle means 12 and a second end 13 having an arm support member 14 comprising a rigid leg 15 affixed to and projecting generally perpendicularly downward from said second end 13 of said arm. The leg 15 is disposed within a tube 16, and the leg and second end of said arm are pivotally connected to said tube 16 by a bolt 17 or other means. Opposite to said pivotal connection the leg defines a foot or projection 18 which extends from the leg away from the first end of said arm. Tube 16 defines an opening 19 through which foot 18 may be partially extended. The portion of foot 18 that is extendable through opening 19 is grooved horizontally with grooves 25 as shown.

Arm support member 14 is adapted to be slidably positioned within tube 20 which is affixed to a support plate 21. Tube 20 has a rigid stop 22, affixed thereto by means of a clamping collar 23. Stop 22 is positioned and locked to prevent blade 30 from slipping into the path of the moving tool or saw. It is adjustable to accommodate different horizontal settings of the radial saws. Tube 20 has interior grooves 24 matching grooves 25 of foot 18. Support plate 21 may be adjustably anchored to a work bench by means of slot 35 or, alternatively, special brackets or clamps may be provided that are adapted to particular makes of table saws or other tools.

The particular clamping or holding means is not a critical part of this invention, but may be varied to accommodate any of the many models and makes of tools, such as radical saws, as the manufacturer desires.

Handle means 12 is fastened to arm 10 by means of a turnable or rotatable sleeve 26 having a pair of facing lips 31 extending therefrom, such as, for example, a spring binder. Sleeve 26 terminates remote from handle 12 in a collar 27. A spring coil 28 is connected between collar 27 and core piece 9 by inserting the ends of said coil in holes 32. A blade 30 of resilient sheet material and comprising a plurality of individual flexible fingers is inserted between facing lips 31. Blade 30 is gripped by the lips 31 preferably using a releasable means such as one or more thumb screws or set screws (not shown) that may be appropriately anchored in either of the lips. The plurality of parallel lines shown in blade 30 in FIG. 1 represent slits which extend roughly halfway of the width of the blade and completely cut through the blade material including the U-shaped portion, thereby forming a plurality of resilient fingers or tines, and increasing the efficiency of the hold down arm to adapt to different work pieces.

The flexible fingers of blade 30 are bent downwardly and backwardly in a horizontal U-shape as shown. The surface of the fingers that engage the workpiece are advantageously somewhat rough and non-skidding or non-slipping in order that a secure hold on the workpiece is obtained. Preferably the blade will be in a horizontal line at the point the fingers engage the workpiece so that the piece is held down without any substantial horizontal force vector.

To raise or lower the arm the operator has merely to lift handle means 12 thereby retracting foot 18 and disengaging grooves 24 and 25. The operator thereupon lifts or drops arm 10 as desired. When the appropriate height is reached handle 12 is released, foot 18 extends through window 19 and grooves 24 and 25 are engaged to lock the arm in a fixed vertical but horizontally rotatable position.

The amount of pressure on the workpiece is then governed by the amount of thrust exerted downwardly on the handle 12. By easing up on the handle 12 pressure on the workpiece is lessened, or the handle 12 may be tipped upwardly and the arm completely removed from the workpiece.

A pin 39 anchored in core 9 and extending through slot 33 determines the extent of the axial movement of the blade and also prevents end play of the sleeve 26 on the core 9. Spring 28 keeps the blade tipped upwards and away from the working surface when not in use.

As is readily apparent the flexible fingers of blade 30 will exert pressure over the entire length of the blade regardless of whether the surface of the workpiece is uneven or warped or the material is not of uniform thickness. Blade 30 is removable so that various blades may be used depending on the material being worked. From the operator's position one can readily adjust the height of the hold down arm to accommodate varying thickness of material. Further, once locked in its vertical position, the arm is easily movable horizontally as the operator desires.

Various modifications may be made in the present invention without departing from the spirit or scope thereof and it is understood that I limit myself only as defined in the appended claims.

I claim:

1. A hold down arm having a first end and a second end, the first end having a handle means, the second end having an arm support member comprising a rigid leg affixed to and projecting generally perpendicular from said second end of said arm, said leg having a knee and an oppositely disposed foot, said leg being disposed within and pivotally connected to a tube at said knee, said tube defining an opening through which said foot may be extended or retracted by pivotal movement of said arm.

2. A hold down arm having a first end and second end and comprising a rigid core piece, a sheath rotatably surrounding at least a major portion of said core piece, said sheath having a pair of facing lips extending from at least a major portion of the extend thereof said lips holding a blade and said blade comprising a plurality of individual flexible fingers extending away from the facing lips and terminating in a downwardly and backwardly facing U-shape and wherein said first end comprises a handle means.

3. Hold down arm of claim 2 wherein said second end comprises an arm support member comprising a rigid leg affixed to and projecting generally perpendicularly from said second end of said arm, said leg having a knee and an oppositely disposed foot, said leg being disposed within and pivotally connected to a tube at said knee, and said tube defining an opening through which said foot may be extended or retracted by pivotal movement of said arm.

* * * * *